United States Patent
Nakamura et al.

(10) Patent No.: US 11,682,520 B2
(45) Date of Patent: Jun. 20, 2023

(54) FILM CAPACITOR MANUFACTURING METHOD AND CASE

(71) Applicant: HITACHI CHEMICAL COMPANY, LTD., Tokyo (JP)

(72) Inventors: Kasumi Nakamura, Tokyo (JP); Tatsuhito Fukuhara, Tokyo (JP); Yasunori Kawabata, Tokyo (JP); Takahide Iwaya, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 228 days.

(21) Appl. No.: 16/759,619

(22) PCT Filed: Oct. 30, 2017

(86) PCT No.: PCT/JP2017/039165
§ 371 (c)(1),
(2) Date: Apr. 27, 2020

(87) PCT Pub. No.: WO2019/087260
PCT Pub. Date: May 9, 2019

(65) Prior Publication Data
US 2020/0350121 A1    Nov. 5, 2020

(51) Int. Cl.
*H01G 2/10*     (2006.01)
*H01G 4/224*    (2006.01)

(52) U.S. Cl.
CPC ............. *H01G 2/103* (2013.01); *H01G 2/106* (2013.01); *H01G 4/224* (2013.01)

(58) Field of Classification Search
CPC ............ H01G 4/224; H01G 4/18; H01G 2/10; H01G 2/106; H01G 2/103
See application file for complete search history.

(56) References Cited

U.S. PATENT DOCUMENTS 4,914,547 A * 4/1990 Toro ....................... H01G 2/065
29/25.42

FOREIGN PATENT DOCUMENTS

| CN | 201946435 U | | 8/2011 |
|---|---|---|---|
| CN | 106298238 A | | 1/2017 |
| JP | S57-071322 | | 4/1982 |
| JP | 57092822 A | * | 6/1982 |
| JP | H9-162069 A | | 6/1997 |
| JP | 2000323355 A | * | 11/2000 |

(Continued)

*Primary Examiner* — David M Sinclair
(74) *Attorney, Agent, or Firm* — Fitch, Even, Tabin & Flannery, LLP

(57) ABSTRACT

A method for producing a film capacitor, the method including a sealing material supplying step of supplying a curable sealing material 30a to an element accommodating space 20a in which a film capacitor element 10 having a rolled body 12 is accommodated; and a curing step of curing the sealing material 30a in a state in which the rolled body 12 is embedded in the sealing material 30a, in which at the time of initiating the sealing material supplying step, the rolled body 12 is not fixed by the sealing material 30a, and in the sealing material supplying step, the sealing material 30a is supplied to the element accommodating space 20a without curing the sealing material 30a, from the beginning of the supply of the sealing material 30a to the element accommodating space 20a until the rolled body 12 is embedded in the sealing material 30a.

18 Claims, 6 Drawing Sheets

(56) References Cited

FOREIGN PATENT DOCUMENTS

| | | | | |
|---|---|---|---|---|
| JP | 2001210546 | A | * | 8/2001 |
| JP | 2003338424 | A | * | 11/2003 |
| JP | 2008205074 | A | * | 9/2008 |
| JP | 2009-094266 | A | | 4/2009 |
| JP | 2012134338 | A | * | 7/2012 |
| JP | 2015095611 | A | * | 5/2015 |
| KR | 20110066385 | A | * | 7/2011 |

* cited by examiner (a)

(b)

(b)

(c)

(a)

(b)

(a)

(b)

FILM CAPACITOR MANUFACTURING METHOD AND CASE

CROSS-REFERENCE TO RELATED APPLICATIONS

This application is a U.S. national phase application filed under 35 U.S.C. § 371 of International Application No. PCT/JP2017/039165, filed Oct. 30, 2017, designating the United States, which is hereby incorporated herein by reference in its entirety.

TECHNICAL FIELD

The present invention relates to a method for producing a film capacitor, and a case.

BACKGROUND ART

Film capacitors are used in, for example, power converters (power conditioners) in solar cells, industrial equipment, electric cars, and the like. A film capacitor includes, for example, a film capacitor element having a film main body, which is a rolled body or a laminated body of a film, and a sealing portion that seals the film capacitor element, the film capacitor can be obtained by disposing the film capacitor element inside an element accommodating space of a mold member having the element accommodating space that accommodates the film capacitor element, subsequently supplying a curable sealing material to the element accommodating space to form the sealing portion (see, for example, the following Patent Literature 1).

CITATION LIST

Patent Literature

Patent Literature 1: Japanese Unexamined Patent Publication No. 2009-094266

SUMMARY OF INVENTION

Technical Problem

In the film capacitor, it is required to seal the entirety of the film main body with the sealing portion from the viewpoint of protecting the film main body of the film capacitor element, and it is required to cover the entirety of the film main body by supplying a sealing material to the element accommodating space where the film capacitor element is accommodated. In conventional methods for producing a film capacitor, there is a tendency that a sealing material is cured to fix the film capacitor element after supplying the sealing material into the element accommodating space until the bottom part of the film main body is immersed therein, and then, the sealing material is further supplied into the element accommodating space until the entirety of the film main body is covered, and subsequently the sealing material is cured. However, in a case in which the sealing material is supplied and cured several times, the production step becomes complicated concomitantly with an increase in the number of steps, and therefore, a method for efficiently obtaining a film capacitor is required.

The present invention has been achieved in view of such circumstances, and it is an object of the present invention to provide a method for producing a film capacitor, by which a film capacitor can be efficiently obtained. Furthermore, it is another object of the present invention to provide a case for a film capacitor, by which a film capacitor can be efficiently obtained.

Solution to Problem

A method for producing a film capacitor of the present invention includes a sealing material supplying step of supplying a curable sealing material to a space in which a film capacitor element having a film main body is accommodated; and a curing step of curing the sealing material in a state in which the film main body is embedded in the sealing material, in which at the time of initiating the sealing material supplying step, the film main body is not fixed by the sealing material, and in the sealing material supplying step, the sealing material is supplied to the space without curing the sealing material, from the beginning of the supply of the sealing material to the space until the film main body is embedded in the sealing material.

According to the method for producing a film capacitor of the present invention, in the sealing material supplying step, since the sealing material is supplied to the space without curing the sealing material from the beginning of the supply of the sealing material to the space until the film main body is embedded in the sealing material, supplying and curing of the sealing material several times in order to embed the film main body in the sealing material can be avoided, and therefore, a film capacitor can be efficiently obtained. In this case, since the time required for the supply and curing of the sealing material can be shortened, the operation efficiency can be enhanced, and therefore, the productivity of a film capacitor can be enhanced. Furthermore, since the time when the film main body is exposed to the outside can be shortened by shortening the operation of supplying the sealing material, incorporation of impurities into the space where the film capacitor element is accommodated can be suppressed. In addition, since the load (for example, thermal history at the time of thermal curing) on the film capacitor element in the curing step can be relieved by shortening the operation of curing the sealing material, the film capacitor can acquire a prolonged life, and also, the range of selection for the film to be used in the film main body can be widened.

Incidentally, when the sealing material is supplied to the space, there are occasions in which the film capacitor element having a film main body floats by buoyancy to the liquid surface of the sealing material, and there are occasions in which it is not easy to embed the film main body in the sealing material. However, the method for producing a film capacitor of the present invention may be an embodiment in which the film capacitor element further has a wiring member that is connected to the film main body and also extends out of the space, and in the sealing material supplying step, the film main body is fixed by fixing the wiring member outside the space, from the beginning of the supply of the sealing material to the space until the film main body is embedded in the sealing material. In this case, since the film capacitor element can be inhibited from floating by buoyancy to the liquid surface of the sealing material in the sealing material supplying step, a film capacitor can be obtained more efficiently. Furthermore, since the fixing means for the wiring member is unlikely to receive spatial restriction outside the space, the range of selection for the fixing means can be widened. In addition, the fixing means remaining inside the sealing material can be avoided.

The method for producing a film capacitor of the present invention may be an embodiment in which in the sealing material supplying step, the film main body is fixed by a fixing member (excluding a curable sealing material and a cured product thereof) disposed inside the space, from the beginning of the supply of the sealing material to the space until the film main body is embedded in the sealing material. In this case, the film capacitor element can be inhibited from floating by buoyancy to the liquid surface of the sealing material in the sealing material supplying step, and therefore, a film capacitor can be obtained more efficiently.

The method for producing a film capacitor of the present invention may be an embodiment in which in the sealing material supplying step, the film main body is embedded in the sealing material by a member that comes into contact with the film capacitor element as a result of the film capacitor element floating when the sealing material is supplied to the space. In this case, even in a case in which the film capacitor element floats by buoyancy in the sealing material supplying step, the film main body can be embedded in the sealing material.

The method for producing a film capacitor of the present invention may also be an embodiment in which the space is formed in a case for constituting the film capacitor. The method for producing a film capacitor of the present invention may also be an embodiment in which the case has an opening portion that is in communication with the space, and in the sealing material supplying step, the sealing material is supplied to the space through the opening portion in a state in which the opening portion is opened upward.

The method for producing a film capacitor of the present invention may also be an embodiment in which the sealing material is continuously supplied to the space, from the beginning of the supply of the sealing material to the space until the film main body is embedded in the sealing material. In this case, compared to the case of intermittently supplying the sealing material, the operation efficiency can be further enhanced, and therefore, the productivity of the film capacitor can be further enhanced.

A case of the present invention is a case for constituting a film capacitor, and the case has a space that accommodates a film capacitor element having a film main body and also has a fixing member for fixing the film main body. In this case, by fixing the film main body with a fixing member when the sealing material is supplied to the space that accommodates a film capacitor element, the film capacitor element can be inhibited from floating by buoyancy to the liquid surface of the sealing material, and therefore, a film capacitor can be obtained more efficiently. Furthermore, a film capacitor can be obtained without preparing a fixing member for fixing the film main body, as a member other than the case.

The case of the present invention may be an embodiment in which the fixing member is disposed inside the space.

Advantageous Effects of Invention

According to the present invention, a film capacitor can be efficiently obtained. In this case, the productivity of the film capacitor can be enhanced. Furthermore, according to the present invention, incorporation of impurities into the space in which a film capacitor element is accommodated can be suppressed. In addition, according to the present invention, the film capacitor can acquire a prolonged life, and also, the range of selection for the film to be used in the film main body can be widened.

DESCRIPTION OF EMBODIMENTS

Hereinafter, embodiments for carrying out the present invention will be described in detail. However, the present invention is not intended to be limited to the following embodiments.

The film capacitor of the present embodiment includes a film capacitor element and a sealing portion that seals the film capacitor element. The film capacitor element has a film main body formed from a film. The film main body may be a rolled body of a film (film structure formed by rolling a film (film capacitor rolled element)), or may be a laminated body of a film (film structure formed by laminating a film). As the film, for example, a metalized film that is obtainable by subjecting a resin film to metal vapor deposition can be used. That is, as the film main body, a rolled body or a laminated body of a metalized film can be used.

The film capacitor element may have an electrode (for example, a metallikon electrode) disposed at both end faces of the film main body (in the case of a rolled body, both end faces in a direction orthogonal to the rolling direction of the film). The film capacitor element may have a wiring member (for example, a lead wire) that is connected to the film main body and also extends to the outside of the sealing portion. For example, the wiring member extends in a direction approximately parallel to the both end faces of the film main body. For example, the wiring member is connected to the film main body by being connected to the electrode. The sealing portion is a cured product of a curable sealing material.

The film capacitor of the present embodiment may further include a case in which an element accommodating space that accommodates a film capacitor element is formed, and in this case, a film capacitor element is sealed by the sealing portion inside the element accommodating space of the case. The film capacitor of the present embodiment may be an embodiment in which the entirety of the sealing portion that seals a film capacitor element is exposed to the outside, without including a case having an element accommodating space that accommodates a film capacitor element. Such a film capacitor can be obtained by sealing a film capacitor element with a sealing material inside the element accommodating space of a mold member that does not constitute the film capacitor, and then separating the mold member from the sealing portion.

Figure 1:
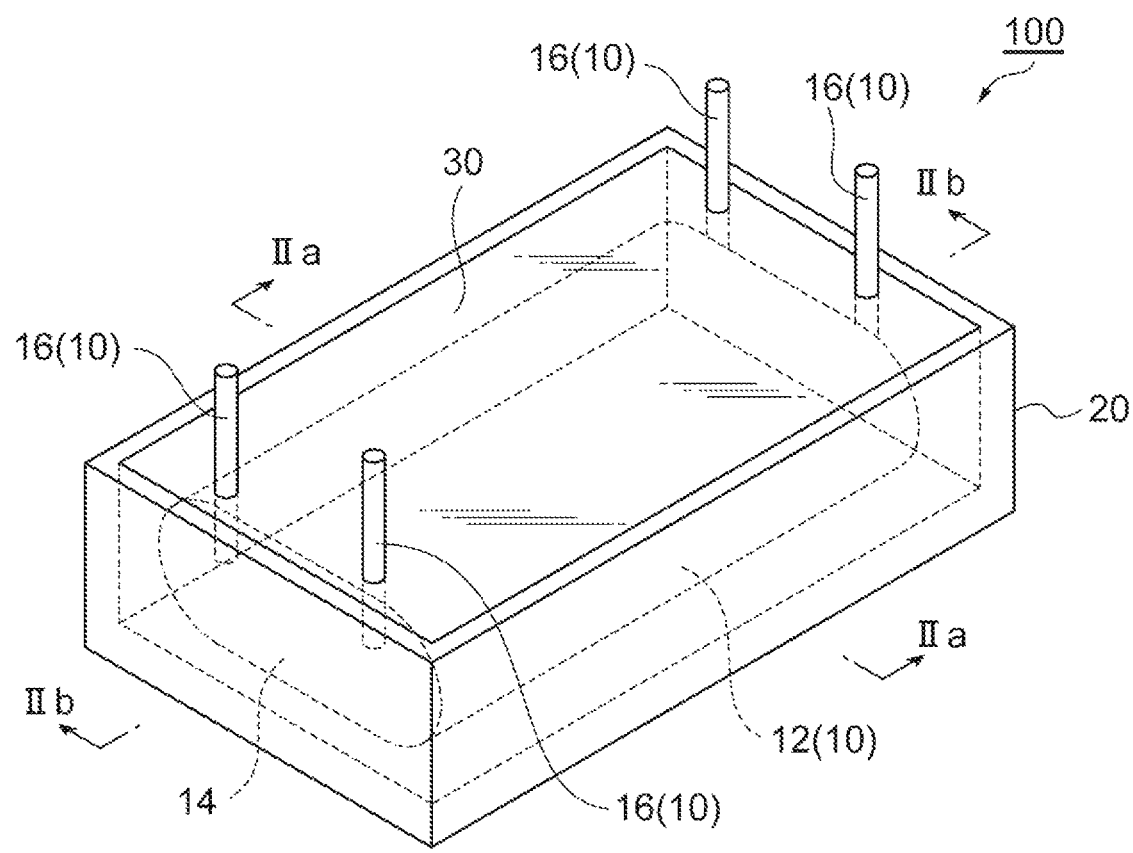
FIG. 1 is a perspective view illustrating an example of a film capacitor.
Figure 2:
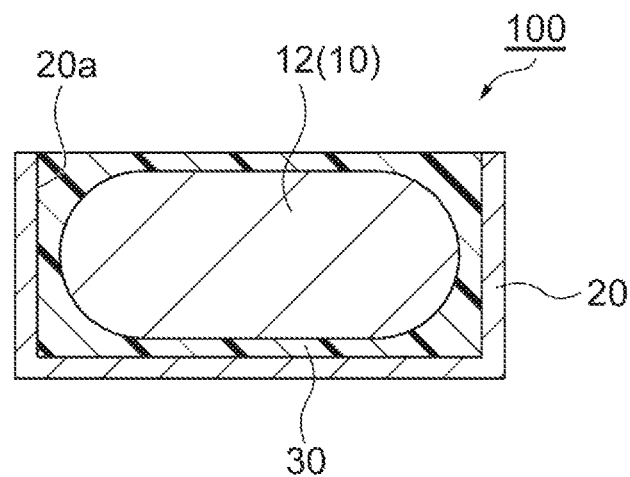
FIG. 2 is an end view illustrating an example of the film capacitor.
Figure 2:
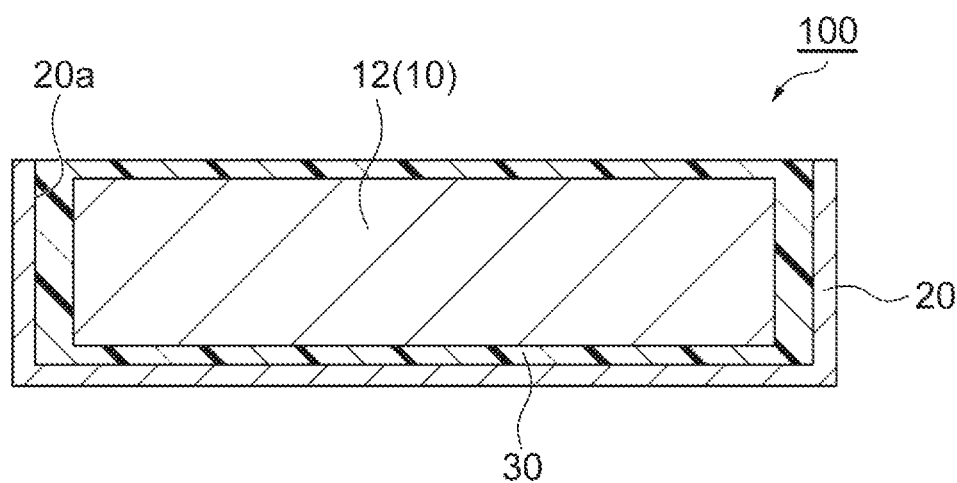

FIG. 1 is a perspective view illustrating an example of the film capacitor. FIG. 2 is an end view illustrating an example of the film capacitor. FIG. 2(a) is an end view of FIG. 1 cut along line IIa-IIa. FIG. 2(b) is an end view of FIG. 1 cut along line IIb-IIb.

A film capacitor 100 illustrated in FIG. 1 and FIG. 2 is a case type film capacitor including a case in which an element accommodating space that accommodates a film capacitor element is formed. The film capacitor 100 includes a film capacitor element 10; an exterior case 20 having a bottom and an element accommodating space 20a that accommodates the film capacitor element 10; and a sealing portion 30 that seals the film capacitor element 10 inside the element accommodating space 20a. For example, the sealing portion 30 is a cured product of a curable resin composition.

For example, the film capacitor element 10 has a rolled body 12, a metallikon electrode 14, and a lead wire 16. For example, a method for producing the film capacitor element 10 includes a step of rolling a member obtainable by subjecting a resin film to metal vapor deposition (metalized film), and thus obtaining the rolled body 12; a step of subjecting both end faces of the rolled body 12 in a direction orthogonal to the rolling direction of the resin film, to vapor deposition (metallikon treatment) of a metal (metallikon material), and thus obtaining the metallikon electrode 14; and a step of connecting the lead wire 16 to the metallikon electrode 14. Examples of the resin film include a polyethylene terephthalate (PET) film and a polypropylene (PP) film. Examples of the metal for the metal vapor deposition include zinc, tin, and aluminum. For example, the rolled body 12 is a cylindrical body having an approximately elliptical-shaped cross-section. The metallikon electrode 14 can be formed over the respective entire surfaces of the both end faces of the rolled body 12. Examples of the metal for the metallikon electrode 14 include zinc, tin, and aluminum. Regarding the lead wire 16, for example, two lead wires are disposed on each of the both end faces of the rolled body 12, and the two lead wires 16 are disposed on each of the both end faces so as to be separated apart from each other in the longitudinal direction of the end face. For example, the lead wires 16 are connected to the metallikon electrode 14 by means of solder.

For example, the exterior case 20 has a rectangular parallelepiped shape, and has the element accommodating space 20a having a rectangular parallelepiped-shape inside thereof. In the upper part of the exterior case 20, an opening portion that is in communication with the element accommodating space 20a is formed. For example, the exterior case 20 is formed from polyphenylene sulfide (PPS), polybutylene terephthalate (PBT), or the like. The lead wire 16 of the film capacitor element 10 extends in the opening direction of the opening portion of the exterior case 20, and the portion at the tip side of the lead wire 16 protrudes out of the element accommodating space 20a.

For example, the sealing portion 30 fills the inside of the element accommodating space 20a of the exterior case 20 so as to cover the entirety of the rolled body 12 of the film capacitor element 10 (so that the rolled body 12 is not exposed to the outside). Inside the sealing portion 30, the sealing portion 30 is interposed between the film capacitor element 10 and the side wall of the exterior case 20, and the film capacitor element 10 is disposed to be separated apart from the side wall of the exterior case 20. Inside the sealing portion 30, the sealing portion 30 is interposed between the film capacitor element 10 and the bottom face of the exterior case 20, and the film capacitor element 10 is disposed to be separated apart from the bottom face of the exterior case 20. In a case in which the sealing portion 30 is interposed between the film capacitor element 10 and the exterior case 20 as such, the film capacitor element 10 is likely to be sufficiently protected by the sealing portion 30, and therefore, the film capacitor is likely to acquire a prolonged life.

The structure of the film capacitor is not limited to the above-mentioned embodiments. For example, regarding the film capacitor element to be sealed by the sealing portion, there may be one element, or there may be a plurality of elements. Inside the sealing portion, the film capacitor element may be in contact with the side wall of the case, without interposing the sealing portion between the film capacitor element and the side wall of the case. Inside the sealing portion, the film capacitor element may be in contact with the bottom face, without interposing the sealing portion between the film capacitor element and the bottom face of the case (see FIG. 4 that will be described below). Inside the sealing portion, a fixing member for fixing the film main body at the time of supplying a sealing material to the element accommodating space, may be disposed (see FIG. 5 that will be described below). Inside the sealing portion, an exposure preventing member that comes into contact with the film capacitor element as a result of the film capacitor element floating when the sealing material is supplied to the element accommodating space, may be disposed (see FIG. 6 that will be described below).

The method for producing a film capacitor of the present embodiment includes a sealing material supplying step of supplying a curable sealing material to an element accommodating space in which a film capacitor element having a film main body is accommodated; and a curing step of curing the sealing material in a state in which the film main body is embedded in the sealing material, in this order. In the method for producing a film capacitor of the present embodiment, at the time of initiating the sealing material supplying step, the film main body is not fixed by the sealing material (a sealing material of the same kind as the sealing material that is supplied in the sealing material supplying step, and a sealing material different from the sealing material that is supplied in the sealing material supplying step), and in the sealing material supplying step, the sealing material is supplied to the element accommodating space without curing the sealing material, from the beginning of the supply of the sealing material to the element accommodating space until the film main body is embedded in the sealing material. For example, the phrase "without curing the sealing material" implies that the sealing material is not retained at a temperature higher than or equal to the curing initiation temperature of the sealing material. At the time of completion of the sealing material supplying step, the film main body is embedded in the sealing material (that is, the entirety of the film main body is covered by the sealing material, and the film main body is not exposed to the outside of the sealing material).

In the method for producing a film capacitor of the present embodiment, a film capacitor including a sealing portion that seals a film capacitor element is obtained by casting a sealing material. Examples of the molding method include vacuum casting, insert molding, injection molding, extrusion molding, and transfer molding. The sealing material is not particularly limited, and for example, a curable resin composition can be used. As the curable resin composition, for example, a resin composition containing an epoxy resin may be mentioned. For example, in a case in which the temperature of the resin composition in the sealing material supplying step is 60° C. or lower, or in a case in which the temperature of the resin composition in the sealing material supplying step is a high temperature (for example, 85° C. or higher) and the time is 2 hours or less, the resin composition can be supplied to the element accommodating space without curing the resin composition containing an epoxy resin. For example, the sealing material has a specific gravity higher than that of the film capacitor element (particularly, film main body).

In the sealing material supplying step, a sealing material can be supplied to an element accommodating space of a mold member in which the element accommodating space is formed. The mold member may be a case for constituting the film capacitor, or may be a member that is finally separated from the sealing portion (a member that does not constitute the film capacitor).

In the sealing material supplying step, the sealing material can be supplied to the element accommodating space continuously or intermittently from the beginning of the supply of the sealing material to the element accommodating space until the film main body is embedded in the sealing material. In a case in which the sealing material is intermittently supplied, after the sealing material has been supplied, the supply of the sealing material can be stopped, and then the sealing material can be supplied again.

In the sealing material supplying step, the film main body may be fixed from the beginning of the supply of the sealing material to the element accommodating space until the film main body is embedded in the sealing material. The fixing method is not particularly limited, and the film main body may be fixed from any direction of an upward direction, a downward direction, a lateral direction, and the like. A plurality of fixing methods may be used in combination.

The film main body may be fixed by a fixing member (excluding a curable sealing material and a cured product thereof) from the beginning of the supply of the sealing material to the element accommodating space until the film main body is embedded in the sealing material. The shape of the fixing member is not particularly limited, and examples thereof include a rod shape and a plate shape. A clip, a pin, or the like can also be used as the fixing member. The fixing member may be a hard member, or may be a bendable soft member. The fixing member may be disposed horizontally, or may be disposed at an inclination. The disposing position of the fixing member is not particularly limited. The film main body may be fixed by a fixing member disposed inside the element accommodating space. Furthermore, in a case in which the film capacitor element has a wiring member that is connected to the film main body and also extends to the outside of the element accommodating space, the film main body may be fixed by fixing the wiring member outside the element accommodating space. Each of wiring members may be individually fixed, or a plurality of wiring members may be fixed altogether.

The case of the present embodiment is a case for a film capacitor for constituting a film capacitor. In the case of the present embodiment, an element accommodating space that accommodates a film capacitor element is formed. A case in which an element accommodating space is formed as such (case constituting a film capacitor) may include the above-mentioned fixing member that fixes the film main body from the beginning of the supply of the sealing material to the element accommodating space until the film main body is embedded in the sealing material. The fixing member may be a body integrated with the case, or may be a body separated from the case.

The fixing member may be disposed inside the element accommodating space of the case. The disposing position of the fixing member inside the element accommodating space is not particularly limited, and for example, the fixing member may be connected to the bottom face or the inner wall surface which forms the element accommodating space. An embodiment in which the fixing member is disposed at the opening portion of the case inside the element accommodating space is also acceptable. Furthermore, an embodiment in which the fixing member is disposed on the inner side than the opening portion of the case inside the element accommodating space, and also, the sealing portion extends to the opening portion side than the fixing member and the fixing member is covered by the sealing portion, is also acceptable. In this case, since the film capacitor element is likely to be sufficiently protected by the sealing portion, the film capacitor is likely to acquire a prolonged life. In addition, the fixing member may be disposed outside the element accommodating space of the case. For example, the film main body may be fixed outside the element accommodating space, by fixing a wiring member of the film capacitor element by means of a fixing member connected to the side wall of the case.

The fixing method is not limited to the method of using a fixing member that constitutes the case, and a fixing member that does not constitute the case can be used. For example, the film main body may be fixed outside the element accommodating space, by fixing a wiring member by means of a member connected to a member (for example, a conveyor) that supports the mold member. Furthermore, the film main body may be fixed outside the element accommodating space, by fixing a wiring member of the film capacitor element by means of a fixing member that is not in contact with the case. It may be fixed by a fixing member disposed in the upper part (for example, upper part in the vertical direction) of the mold member, or for example, the tip portion of a wiring member may be fixed by a plate-shaped member disposed in the upper part (for example, upper part in the vertical direction) of the mold member.

The film main body may not be fixed by a fixing member from the beginning of the supply of the sealing material to the element accommodating space until the film main body is embedded in the sealing material, and an exposure preventing member that prevents the film main body from exposing to the outside of the sealing material can be used so that the film main body is embedded in the sealing material at the time of completion of the sealing material supplying step even in a case in which the film capacitor element floats when the sealing material is supplied to the element accommodating space. That is, in the sealing material supplying step, the film main body may be embedded in the sealing material by an exposure preventing member that comes into contact with the film capacitor element (for example, film main body) as a result of the film capacitor element floating when the sealing material is supplied to the element accommodating space.

The exposure preventing member can be disposed in the upper part (for example, upper part in the vertical direction) of the film capacitor element. For example, the film capacitor element floats such that the exposure preventing member comes into contact with the film main body by supplying the sealing material to the element accommodating space in a state in which the exposure preventing member is disposed in the upper part (for example, upper part in the vertical direction) of the film main body of the film capacitor element, and thereby, the film main body can be embedded in the sealing material at the time of completion of the sealing material supplying step.

The shape of the exposure preventing member is not particularly limited, and examples thereof include a rod shape and a plate shape. The exposure preventing member may be a hard member, or may be a bendable soft member. The exposure preventing member may be disposed horizontally, or may be disposed at an inclination. The disposing position of the exposure preventing member is not particularly limited. The exposure preventing member may be disposed inside the element accommodating space, or may be disposed outside the element accommodating space (for example, a position immediately above the liquid surface of the sealing material). An embodiment in which the exposure preventing member is disposed at the opening portion of the case inside the element accommodating space is also acceptable. Furthermore, an embodiment in which the exposure preventing member is disposed on the inner side than the opening portion of the case inside the element accommodating space, and also, the sealing portion extends to the opening portion side than the exposure preventing member and the exposure preventing member is covered by the sealing portion, is also acceptable. In this case, since the film capacitor element is likely to be sufficiently protected by the sealing portion, the film capacitor is likely to acquire a prolonged life. The exposure preventing member may be connected to the case constituting a film capacitor, or may not be connected to the case constituting a film capacitor. The exposure preventing member connected to the case constituting a film capacitor may be a body integrated with the case, or may be a body separated from the case.

For example, the case for constituting the film capacitor has an opening portion that is in communication with the element accommodating space. In this case, in the sealing material supplying step, the sealing material may be supplied to the element accommodating space through the opening portion in a state in which the opening portion is opened upward (for example, upper part in the vertical direction). In the sealing material supplying step, the sealing material may be supplied sequentially to the element accommodating spaces of a plurality of cases disposed on a conveyor at an interval, while the cases are conveyed by driving the conveyor.

In a case in which the film main body is fixed in the sealing material supplying step, the film main body may be fixed such that the film main body is separated apart from the bottom face of the case for constituting the film capacitor, or the film main body may be fixed such that the film main body is in contact with the bottom face of the case. In a case in which the film main body is fixed such that the film main body is separated apart from the bottom face of the case, a structure in which the sealing portion is interposed between the film capacitor element and the bottom face of the case in the film capacitor can be obtained. In a case in which the film main body is fixed such that the film main body is in contact with the bottom face of the case, a structure in which the sealing portion is not interposed between the film capacitor element and the bottom face of the case in the film capacitor can be obtained. The structure in which the sealing portion is interposed between the film capacitor element and the bottom face of the case can also be obtained, even in a case in which the film main body is not fixed in the sealing material supplying step, by embedding the film main body in the sealing material by means of an exposure preventing member that is comes into contact with the film capacitor element as a result of the film capacitor element floating when the sealing material is supplied to the element accommodating space.

At the time of initiating the sealing material supplying step, there may be no sealing material at all inside the element accommodating space. Furthermore, at the time of initiating the sealing material supplying step, as long as the film main body is not fixed by the sealing material, the sealing material may be present inside the element accommodating space.

In the curing step, a cured product is obtained as a sealing portion, by curing the sealing material that has been supplied into the element accommodating space in a state in which the film main body is embedded in the sealing material. In the curing step, for example, a thermosetting sealing material is heated, and thereby a cured product is obtained. In a state in which the film main body is embedded in the sealing material, for example, the state in which the film main body is fixed in the sealing material supplying step may be maintained, or the state in which the film main body is prevented from being exposed to the outside of the sealing material, by the above-mentioned exposure preventing member, may be maintained.

The method for producing a film capacitor of the present embodiment may include an element disposition step of disposing a film capacitor element inside the element accommodating space, before the sealing material supplying step.

Figure 3:
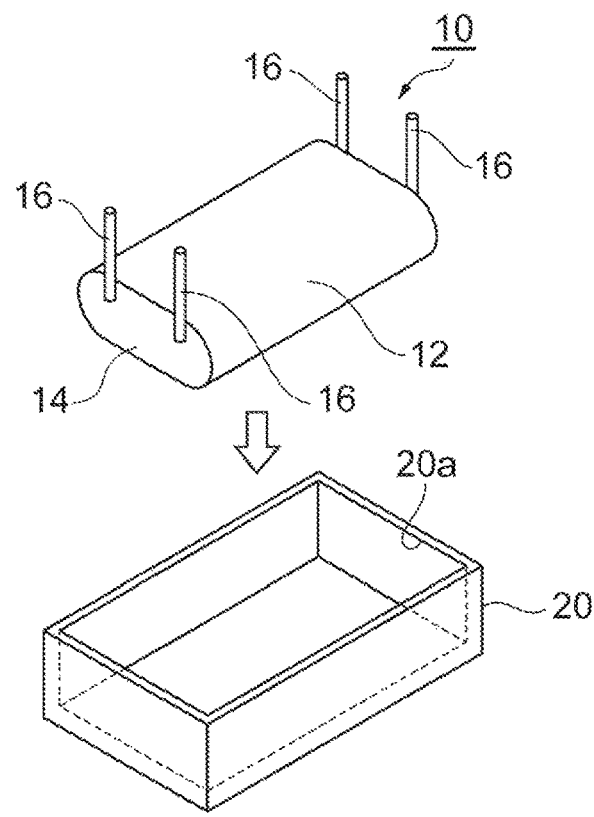
FIG. 3 is a perspective view illustrating an example of a method for producing a film capacitor.
Figure 3:
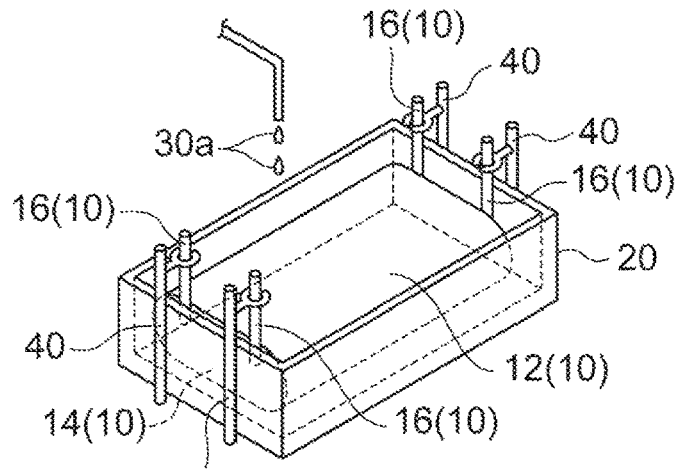
Figure 3:
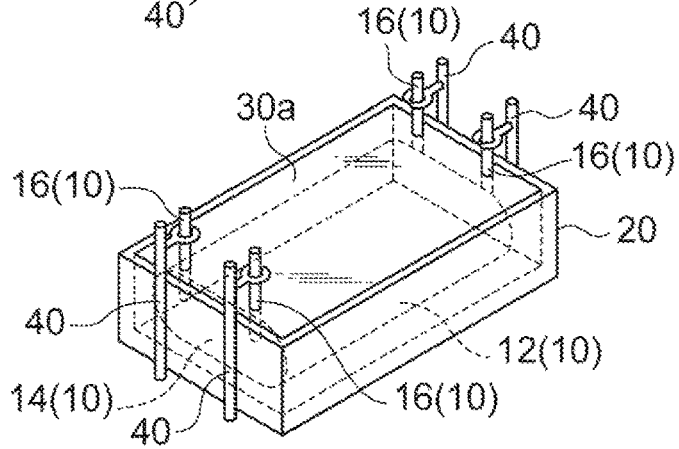

FIG. 3 is a perspective view illustrating an example of the method for producing a film capacitor, and illustrates a method for producing the film capacitor 100 illustrated in FIG. 1 and FIG. 2. First, as illustrated in FIG. 3(a), in the element disposition step, the film capacitor element 10 is disposed inside the element accommodating space 20a of the exterior case 20. Next, as illustrated in FIG. 3(b), in the sealing material supplying step, in a state in which the rolled body 12 is fixed by fixing the lead wire 16 by means of a fixing member 40 outside the element accommodating space 20a, a curable sealing material 30a is continuously supplied into the element accommodating space 20a without curing the sealing material 30a, from the beginning of the supply of the sealing material 30a to the element accommodating space 20a until the rolled body 12 is embedded in the sealing material 30a. The lead wire 16 is fixed such that the film capacitor element 10 is separated apart from the bottom face of the exterior case 20. Thereby, as illustrated in FIG. 3(c), the element accommodating space 20a is filled with the sealing material 30a. Then, in the curing step, the sealing material 30a inside the element accommodating space 20a is cured to obtain a cured product in a state in which the rolled body 12 is embedded in the sealing material 30a, and thereby, the film capacitor 100 illustrated in FIG. 1 and FIG. 2 can be obtained. The fixing member 40 may be removed either before or after the curing step.

Hereinafter, specific examples of the film capacitor and the method for producing the same will be further described. According to the method for producing the film capacitor 100 illustrated in FIG. 3, in the sealing material supplying step, since the sealing material 30a is supplied to the element accommodating space 20a without curing the sealing material 30a, from the beginning of the supply of the sealing material 30a to the element accommodating space 20a until the rolled body 12 is embedded in the sealing material 30a, supplying and curing of the sealing material 30a several times in order to embed the rolled body 12 in the sealing material 30a can be avoided, and therefore, the film capacitor 100 can be efficiently obtained. In this case, since the time required for the supply and curing of the sealing material 30a can be shortened, the operation efficiency can be enhanced, and therefore, the productivity of the film capacitor 100 can be enhanced. Furthermore, since the time when the rolled by 12 is exposed to the outside can be shortened by shortening the operation of supplying the sealing material 30a, incorporation of impurities into the element accommodating space 20a in which the film capacitor element 10 is accommodated can be suppressed. In addition, since the load (for example, thermal history at the time of thermal curing) on the film capacitor element 10 in the curing step can be relieved by shortening the operation of curing the sealing material 30a, the film capacitor 100 can acquire a prolonged life, and also, the range of selection for the film to be used in the rolled body 12 can be widened.

In the method for producing the film capacitor 100 illustrated in FIG. 3, the film capacitor element 10 has the lead wire 16 that is connected to the rolled body 12 and also extends out of the element accommodating space 20a, and in the sealing material supplying step, the rolled body 12 is fixed by fixing the lead wire 16 by means of the fixing member 40 outside the element accommodating space 20a, from the beginning of the supply of the sealing material 30a to the element accommodating space 20a until the rolled body 12 is embedded in the sealing material 30a. In this case, since the film capacitor element 10 can be inhibited from floating by buoyancy to the liquid surface of the sealing material 30a in the sealing material supplying step, the film capacitor 100 can be obtained more efficiently. Furthermore, since the fixing means for the lead wire 16 does not easily receive spatial restriction outside the element accommodating space 20a, the range of selection for the fixing means can be widened. In addition, the fixing means remaining inside the sealing material 30a can be avoided.

In the method for producing the film capacitor 100 illustrated in FIG. 3, the sealing material 30a is continuously supplied to the element accommodating space 20a from the beginning of the supply of the sealing material 30a to the element accommodating space 20a until the rolled body 12 is embedded in the sealing material 30a. In this case, compared to the case of intermittently supplying the sealing material 30a, the operation efficiency can be further enhanced, and therefore, the productivity of the film capacitor 100 can be further enhanced.

Figure 4:
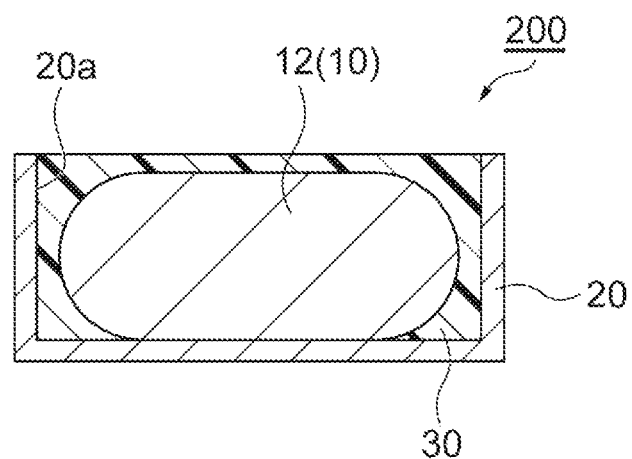
FIG. 4 is an end view illustrating another example of the film capacitor.
Figure 4:
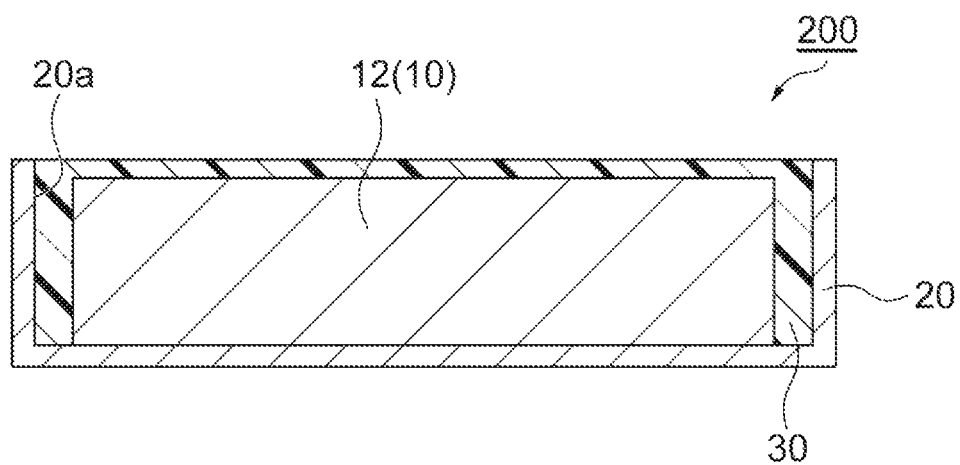

FIG. 4 is an end view illustrating another example of the film capacitor and illustrates an end face at the same position as FIG. 2. In a film capacitor 200 illustrated in FIG. 4, inside the sealing portion 30, the film capacitor element 10 is in contact with the bottom face of the exterior case 20, without interposing the sealing portion 30 between the film capacitor element 10 and the bottom face of the exterior case 20. Such a film capacitor 200 can be obtained by supplying a sealing material to the element accommodating space 20a in a state in which the rolled body 12 is fixed such that the rolled body 12 comes into contact with the bottom face of the exterior case 20 in the sealing material supplying step.

Figure 5:
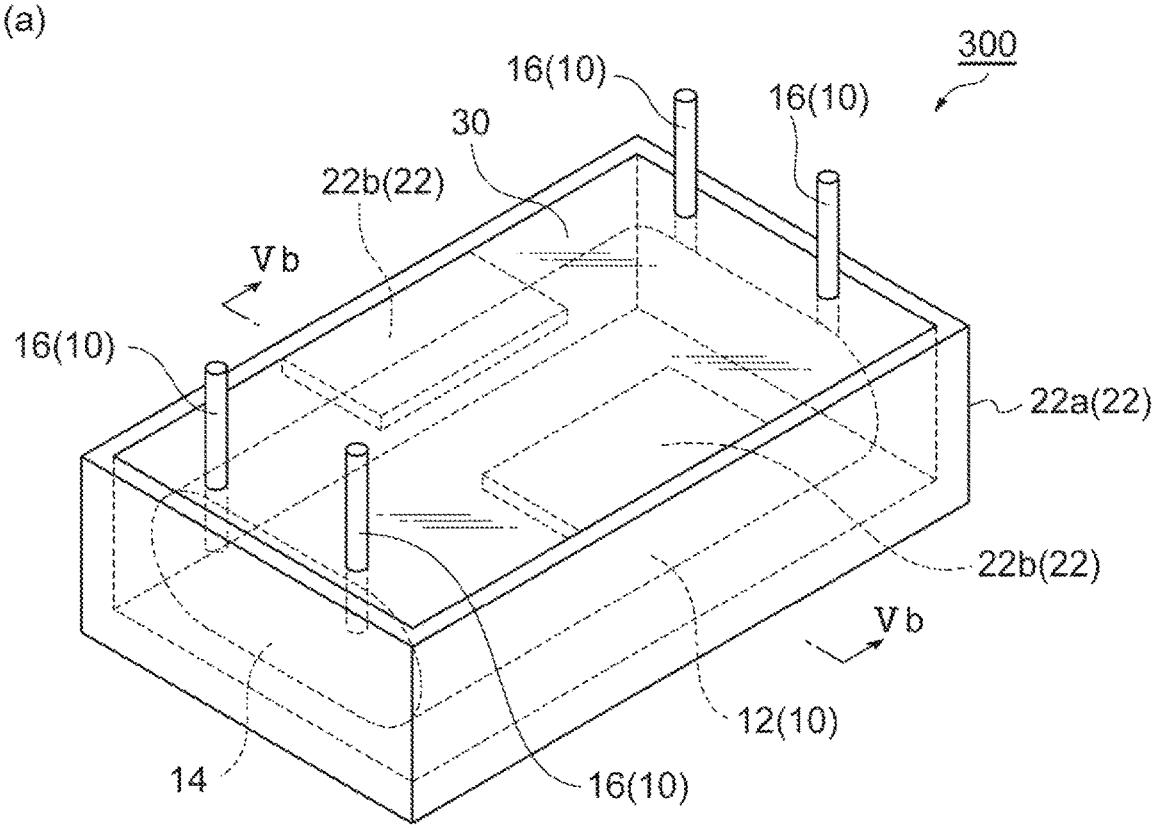
FIG. 5 is a view illustrating another example of the film capacitor.
Figure 5:
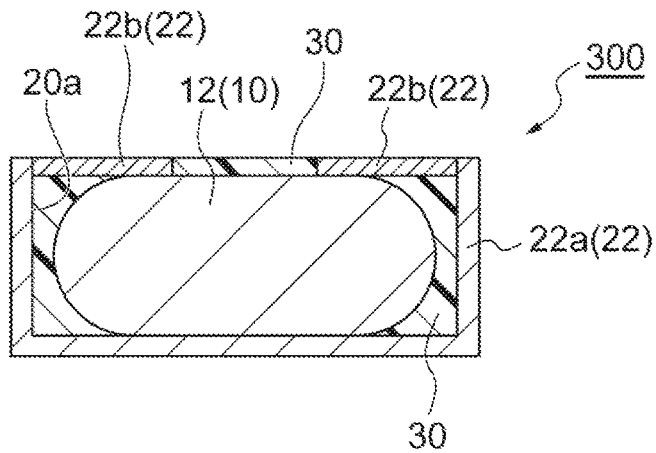

FIG. 5 is a view illustrating another example of the film capacitor. FIG. 5(a) is a perspective view illustrating a film capacitor. FIG. 5(b) is an end view of FIG. 5(a) cut along line Vb-Vb. A film capacitor 300 illustrated in FIG. 5 includes an exterior case 22 having a case main body 22a in which the element accommodating space 20a is formed; and a fixing member 22b disposed inside the sealing portion 30 (element accommodating space 20a). The fixing member 22b fixes the rolled body 12 when a sealing material is supplied to the element accommodating space 20a. Such a film capacitor 300 can be obtained by supplying a sealing material to the element accommodating space 20a in a state in which the rolled body 12 is fixed by the fixing member 22b such that the rolled body 12 is in contact with the bottom face of the exterior case 22 in the sealing material supplying step, from the beginning of the supply of the sealing material to the element accommodating space 20a until the rolled body 12 is embedded in the sealing material.

The film capacitor 300 illustrated in FIG. 5 uses the exterior case 22 in which the element accommodating space 20a that accommodates the film capacitor element 10 having the rolled body 12 is formed, and also, which includes the fixing member 22b for fixing the rolled body 12, as a case for constituting the film capacitor 300. In this case, by fixing the rolled body 12 with the fixing member 22b when a sealing material is supplied to the element accommodating space 20a, the film capacitor element 10 can be inhibited from floating by buoyancy to the liquid surface of the sealing material, and therefore, the film capacitor 300 can be obtained more efficiently. Furthermore, the film capacitor 300 can be obtained without preparing a fixing member for fixing the rolled body 12 as a member other than the exterior case 22.

Figure 6:
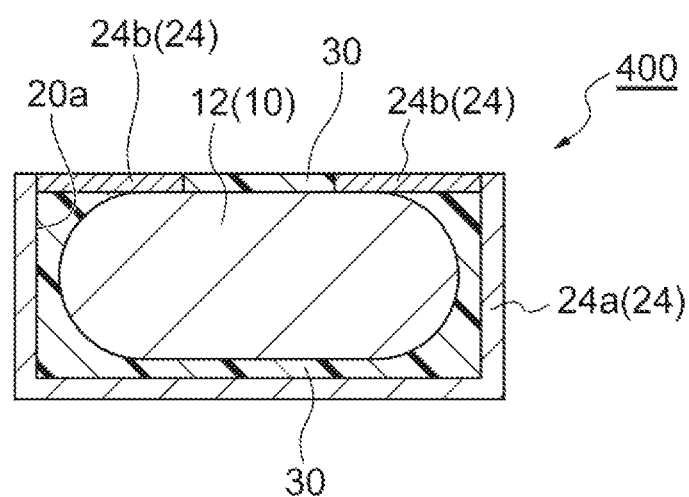
FIG. 6 is an end view illustrating another example of the film capacitor.

FIG. 6 is an end view illustrating another example of the film capacitor. A film capacitor 400 illustrated in FIG. 6 includes an exterior case 24 having a case main body 24a in which the element accommodating space 20a is formed; and an exposure preventing member 24b disposed inside the sealing portion 30 (element accommodating space 20a). Such a film capacitor 400 can be obtained by embedding the rolled body 12 in the sealing material by means of the exposure preventing member 24b that comes into contact with the film capacitor element 10 as a result of the film capacitor element 10 floating when the sealing material is supplied to the element accommodating space 20a in the sealing material supplying step. In this case, even in a case in which the film capacitor element 10 floats by buoyancy in the sealing material supplying step, the rolled body 12 can be embedded in the sealing material.

REFERENCE SIGNS LIST

10: film capacitor element, 12: rolled body (film main body), 14: metallikon electrode, 16: lead wire (wiring member), 20, 22, 24: exterior case, 20a: element accommodating space, 22a, 24a: case main body, 22b, 40: fixing member, 24b: exposure preventing member, 30: sealing portion, 30a: sealing material, 100, 200, 300, 400: film capacitor.

The invention claimed is:

1. A method for producing a film capacitor, the method comprising:
    a step of providing a film capacitor element in a space, the film capacitor element comprising a film main body and a wiring member connected to the film main body;
    a sealing material supplying step of supplying a curable sealing material to the space in which the film capacitor element is provided, wherein, during at least part of the sealing material supplying step, the film capacitor element is fixed in the space by a fixing member directly in contact with the film main body, the fixing member being different from the wiring member, different from the curable sealing material or a cured product thereof, and comprising a plurality of separated members; and
    a curing step of curing the sealing material in a state in which the film main body is embedded in the sealing material,
    wherein at the time of initiating the sealing material supplying step, the film main body is not fixed by the sealing material, and
    in the sealing material supplying step, the sealing material is supplied to the space without curing the sealing material, from a beginning of a supply of the sealing material to the space until the film main body is embedded in the sealing material.

2. The method for producing a film capacitor according to claim 1, wherein the wiring member extends out of the space, and
    in the sealing material supplying step, the film main body is fixed by the fixing member from a beginning of a supply of the sealing material to the space until the film main body is embedded in the sealing material.

3. The method for producing a film capacitor according to claim 2, wherein the space is formed in a case for constituting the film capacitor.

4. The method for producing a film capacitor according to claim 2, wherein the sealing material is continuously supplied to the space, from a beginning of a supply of the sealing material to the space until the film main body is embedded in the sealing material.

5. The method for producing a film capacitor according to claim 1, wherein in the sealing material supplying step, the film main body is embedded in the sealing material by a member that comes into contact with the film capacitor element as a result of the film capacitor element floating when the sealing material is supplied to the space.

6. The method for producing a film capacitor according to claim 5, wherein the space is formed in a case for constituting the film capacitor.

7. The method for producing a film capacitor according to claim 5, wherein the sealing material is continuously supplied to the space, from a beginning of a supply of the sealing material to the space until the film main body is embedded in the sealing material.

8. The method for producing a film capacitor according to claim 1, wherein the space is formed in a case for constituting the film capacitor.

9. The method for producing a film capacitor according to claim 8, wherein the case has an opening portion that is in communication with the space, and
in the sealing material supplying step, the sealing material is supplied to the space through the opening portion in a state in which the opening portion is opened upward.

10. The method for producing a film capacitor according to claim 9, wherein the sealing material is continuously supplied to the space, from a beginning of a supply of the sealing material to the space until the film main body is embedded in the sealing material.

11. The method for producing a film capacitor according to claim 8, wherein the sealing material is continuously supplied to the space, from a beginning of a supply of the sealing material to the space until the film main body is embedded in the sealing material.

12. The method for producing a film capacitor according to claim 1, wherein the sealing material is continuously supplied to the space, from a beginning of a supply of the sealing material to the space until the film main body is embedded in the sealing material.

13. The method for producing a film capacitor according to claim 1, wherein in the sealing material supplying step, the film main body is fixed from an upward direction by the fixing member from a beginning of a supply of the sealing material to the space until the film main body is embedded in the sealing material.

14. A case for constituting a film capacitor,
wherein the case comprises a space for accommodating a film capacitor element to be provided in the case, the film capacitor element to be provided in the case comprising a film main body and a wiring member that is connected to the film main body, and a fixing member configured to directly contact the film main body of the film capacitor element to be provided in the case for fixing the film main body of the film capacitor element to be provided in the case, the fixing member being different from the wiring member and comprising a plurality of separated members.

15. The case according to claim 14, wherein the fixing member is disposed inside the space.

16. A film capacitor comprising the case according to claim 14 and the film capacitor element provided in the case.

17. A method for producing a film capacitor, the method comprising:
a step of providing a film capacitor element in a space, the film capacitor element comprising a film main body and a wiring member connected to the film main body;
a sealing material supplying step of supplying a curable sealing material to the space in which the film capacitor element is provided, wherein, during at least part of the sealing material supplying step, the film capacitor element is fixed in the space by a fixing member directly in contact with the film main body, the fixing member being different from the wiring member and different from the curable sealing material or a cured product thereof, wherein the fixing member fixes the film capacitor element in the space such that the film main body is in contact with the bottom face of the case in the sealing material supplying step, from the beginning of the supply of the sealing material to the element accommodating space until the film main body is embedded in the sealing material; and
a curing step of curing the sealing material in a state in which the film main body is embedded in the sealing material,
wherein at the time of initiating the sealing material supplying step, the film main body is not fixed by the sealing material, and
in the sealing material supplying step, the sealing material is supplied to the space without curing the sealing material, from a beginning of a supply of the sealing material to the space until the film main body is embedded in the sealing material.

18. A case for constituting a film capacitor,
wherein the case comprises a space for accommodating a film capacitor element to be provided in the case, the film capacitor element to be provided in the case comprising a film main body and a wiring member that is connected to the film main body, and a fixing member configured to directly contact the film main body of the film capacitor element to be provided in the case for fixing the film main body of the film capacitor element to be provided in the case, the fixing member being different from the wiring member, and
wherein the fixing member is configured to fix the film capacitor element in the space such that the film main body is in contact with the bottom face of the case in a sealing material supplying step, from the beginning of supply of the sealing material to the element accommodating space until the film main body is embedded in the sealing material.

* * * * *